(12) United States Patent
Conkling et al.

(10) Patent No.: US 12,534,934 B2
(45) Date of Patent: Jan. 27, 2026

(54) DOOR LATCH POSITIONING MECHANISM

(71) Applicant: Textron Aviation Inc., Wichita, KS (US)

(72) Inventors: Richard Stoddard Conkling, Kechi, KS (US); Evan M. Johnson, Wichita, KS (US); Joseph Allan Smarsh, Andale, KS (US)

(73) Assignee: Textron Innovations Inc., Providence, RI (US)

( * ) Notice: Subject to any disclaimer, the term of this patent is extended or adjusted under 35 U.S.C. 154(b) by 292 days.

(21) Appl. No.: 18/338,779

(22) Filed: Jun. 21, 2023

(65) Prior Publication Data

US 2023/0407685 A1     Dec. 21, 2023

Related U.S. Application Data

(60) Provisional application No. 63/353,874, filed on Jun. 21, 2022.

(51) Int. Cl.
| | |
|---|---|
| *B64C 1/14* | (2006.01) |
| *E05B 41/00* | (2006.01) |
| *E05B 77/22* | (2014.01) |
| *E05B 83/36* | (2014.01) |
| *E05C 9/24* | (2006.01) |

(52) U.S. Cl.
CPC ............ *E05B 41/00* (2013.01); *B64C 1/1407* (2013.01); *E05B 77/22* (2013.01); *E05B 83/36* (2013.01); *E05C 9/24* (2013.01)

(58) Field of Classification Search
CPC ..... B64C 1/1407; B64C 1/1423; B64C 1/143; B64C 1/1415; E05C 9/24

USPC ....................................................... 244/129.5
See application file for complete search history.

(56) References Cited

U.S. PATENT DOCUMENTS

| | | | |
|---|---|---|---|
| 3,791,073 A * | 2/1974 | Baker ..................... | B64C 1/143 49/40 |
| 4,470,566 A | 9/1984 | Fitzgerald | |
| 4,473,201 A * | 9/1984 | Barnes .................. | B64C 1/1415 292/216 |

(Continued)

FOREIGN PATENT DOCUMENTS

| | | | | |
|---|---|---|---|---|
| CN | 107060553 A | * | 8/2017 | ........... B64C 1/1407 |
| CN | 108058805 A | * | 5/2018 | |

(Continued)

*Primary Examiner* — Kristina R Fulton
*Assistant Examiner* — Emily G. Brown
(74) *Attorney, Agent, or Firm* — Avek IP, LLC

(57) ABSTRACT

A latch positioning mechanism for an aircraft door includes one or more locking members configured to be partially driven into a frame around the door via rotation of a pivot pin. A frame bumper extends outside of the door in a pre-catch position for contacting the frame. A catch bellcrank is operatively coupled to the frame bumper, and a biasing member biases rotation of the catch bellcrank to bias the frame bumper into the pre-catch position. The catch bellcrank is configured to contact a catch cam when the catch bellcrank is biased into the pre-catch position such that the catch cam prevents release of the one or more locking members for locking the door. Upon the frame bumper contacting the frame when the door is closed, the catch cam is released enabling the one or more locking members to be moved into a locked position.

19 Claims, 11 Drawing Sheets

(56) References Cited

U.S. PATENT DOCUMENTS

| | | | |
|---|---|---|---|
| 5,180,121 | A | 1/1993 | Banks et al. |
| 8,752,794 | B2 | 6/2014 | Gorgoglione |
| 10,711,487 | B2 | 7/2020 | Ward |
| 10,746,378 | B2 | 8/2020 | Bachman et al. |
| 11,384,575 | B2 | 7/2022 | Bellavia et al. |
| 11,639,615 | B2 | 5/2023 | Savidge et al. |
| 11,661,167 | B2 | 5/2023 | Buchet |
| 12,196,018 | B2 * | 1/2025 | Martin ................ E05B 63/0052 |
| 2002/0000493 | A1 * | 1/2002 | Erben .................... B64C 1/1407 |
| | | | 244/129.5 |
| 2010/0001136 | A1 * | 1/2010 | Wilson .................. B64C 1/1415 |
| | | | 292/336.3 |
| 2011/0049299 | A1 | 3/2011 | Gowing et al. |
| 2018/0119926 | A1 * | 5/2018 | Bachman ............ B64D 45/0005 |
| 2020/0071978 | A1 | 3/2020 | Holtrup et al. |
| 2021/0229792 | A1 | 7/2021 | Blum et al. |
| 2021/0262255 | A1 * | 8/2021 | Blum ........................ E05C 3/02 |

FOREIGN PATENT DOCUMENTS

| | | |
|---|---|---|
| DE | 3539480 A1 * | 5/1987 |
| WO | 2013172804 A1 | 11/2013 |

\* cited by examiner

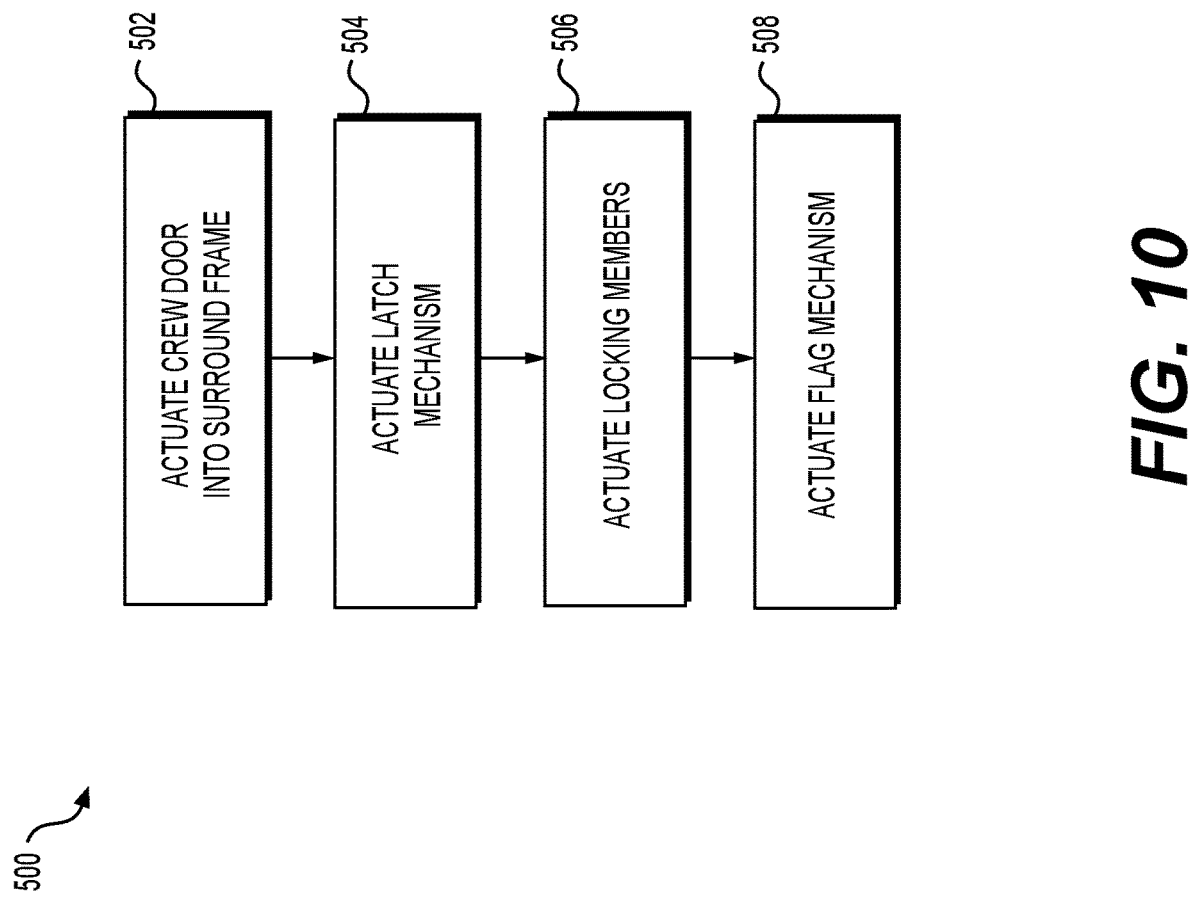

DOOR LATCH POSITIONING MECHANISM

CROSS-REFERENCE TO RELATED APPLICATIONS

This application claims the benefit of priority of U.S. Provisional Patent Application No. 63/353,874, entitled Crew Door Flag and filed on Jun. 21, 2022, the disclosure of which is herein incorporated by reference in its entirety.

BACKGROUND

1. Field

Embodiments of the invention relate generally to doors, and more specifically to doors having locking mechanisms.

2. Related Art

Various solutions to door locking mechanisms have been disclosed in the art. For example, U.S. Patent Application Publication No. 2021/0229792 to Blum et al. discloses an actuating system that securely locks an actuatable door. U.S. Patent Application Publication No. 2019/0017304 to Bellavia et al. discloses a keeper for a lock of an aircraft door. U.S. Pat. No. 5,180,121 to Banks et al. discloses an aircraft door assembly. U.S. Patent Application Publication No. 2020/0181943 to Savidge et al. discloses an escape hatch of an aircraft. U.S. Pat. No. 10,746,378 to Bachman et al. discloses an optical display for displaying a mechanical state of a lock. U.S. Pat. No. 10,711,487 to Ward discloses a cabin door that includes a lock. Various other door locking mechanisms are disclosed in U.S. Pat. No. 8,752,794 to Gorgoglione, U.S. Patent Application Publication No. 2021/0070416 to Buchet, and U.S. Patent Application Publication No. 2020/0071978 to Holtrup et al.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a latch positioning mechanism for a door of an aircraft is configured to retain a latching and locking system of the door in a pre-catch position when the door is open and release the latching and locking system from the pre-catch position when the door is closed. The latch positioning mechanism includes: a pivot pin; one or more locking members operatively connected to the pivot pin, wherein the one or more locking members are configured to be partially driven into a frame around the door via rotation of the pivot pin; a frame bumper configured to extend outside of the door in a pre-catch position for contacting a frame surrounding the door; a catch bellcrank operatively coupled to the frame bumper; a biasing member operatively coupled to the catch bellcrank, wherein the biasing member biases rotation of the catch bellcrank to bias the frame bumper into the pre-catch position; a catch cam operatively coupled to the pivot pin, wherein the catch bellcrank is configured to contact the catch cam when the catch bellcrank is biased into the pre-catch position such that the catch cam prevents release of the one or more locking members for locking the door; and the frame bumper is configured to contact the frame upon the door being closed thereby counterrotating the catch bellcrank to overcome the biasing member and release the catch cam enabling the one or more locking members to be moved into a locked position.

In another embodiment, a latch positioning mechanism for a door of an aircraft includes: a pivot pin; one or more locking members operatively connected to the pivot pin, wherein the one or more locking members are configured to be partially driven into a frame around the door via rotation of the pivot pin; a frame bumper configured to extend outside of the door in a pre-catch position for contacting a frame surrounding the door; a catch bellcrank operatively coupled to the frame bumper; a biasing member operatively coupled to the catch bellcrank, wherein the biasing member biases rotation of the catch bellcrank to bias the frame bumper into the pre-catch position; a catch cam operatively coupled to the pivot pin, wherein the catch bellcrank is configured to contact the catch cam when the catch bellcrank is biased into the pre-catch position such that the catch cam prevents release of the one or more locking members for locking the door; the frame bumper is configured to contact the frame upon the door being closed thereby counterrotating the catch bellcrank to overcome the biasing member and release the catch cam enabling the one or more locking members to be moved into a locked position; and an elastic member operatively coupled to the catch cam for biasing the catch cam such that a first side of catch cam is biased towards the catch bellcrank.

In yet another embodiment, a pre-catch latching method for a door of an aircraft includes: extending a frame bumper outside of the door into a pre-catch position; contacting a frame surrounding the door with the frame bumper upon closing of the door; rotating a catch bellcrank operatively coupled to the frame bumper via a biasing member, wherein the biasing member biases rotation of the catch bellcrank to bias the frame bumper into the pre-catch position; and, contacting a catch cam via the catch bellcrank when the catch bellcrank is biased into the pre-catch position thereby preventing release of one or more locking members for locking the door.

BRIEF DESCRIPTION OF THE DRAWING FIGURES

Embodiments of the invention are described in detail below with reference to the attached drawing figures, wherein:

FIG. 10 depicts a process-flow diagram illustrating a door locking method using the system of FIGS. 2A-9, in some embodiments.

Figure 1:
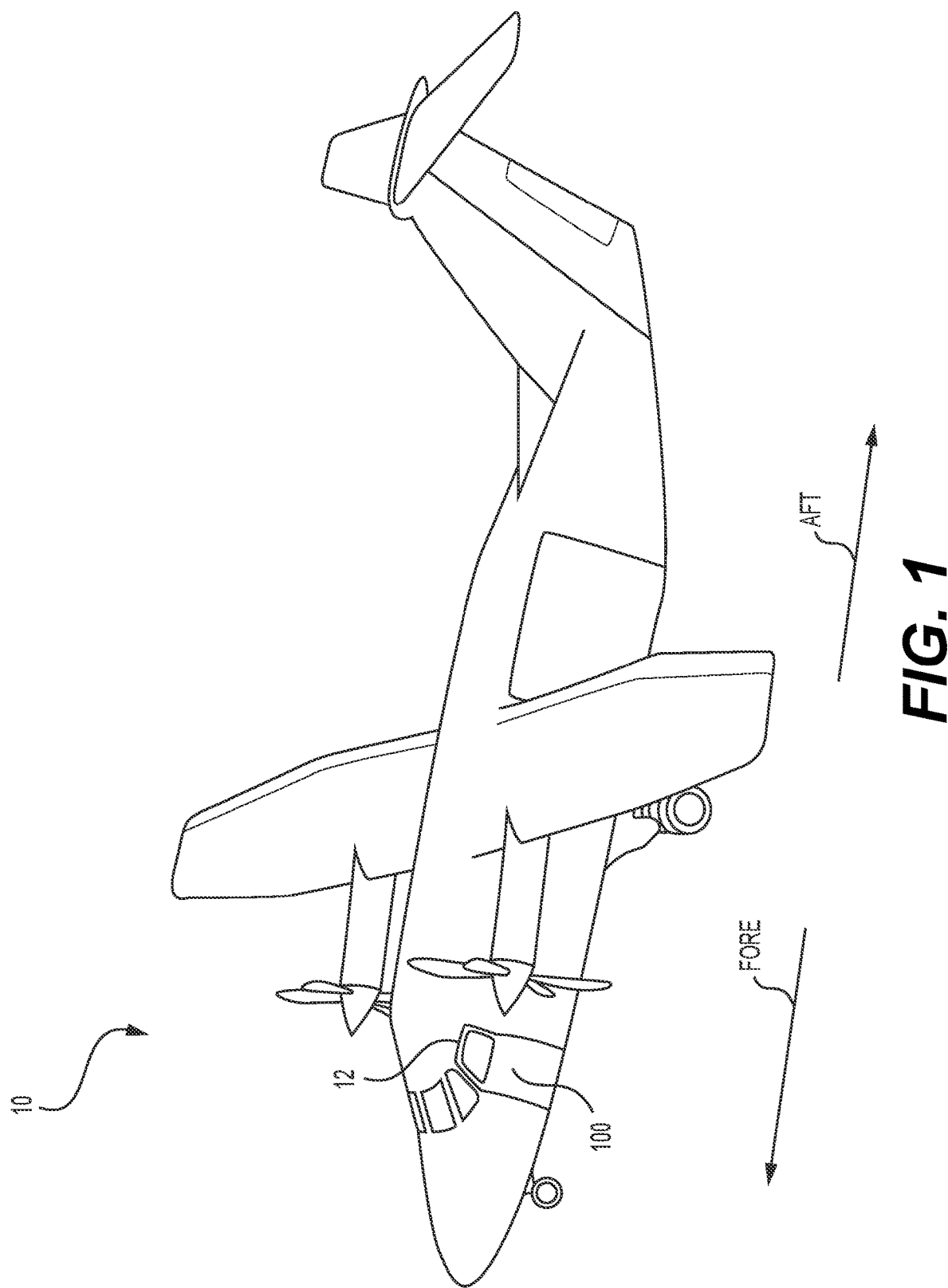
FIG. 1 illustrates a vehicle of some embodiments upon which a door may be included.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Doors located on vehicles having high speeds and potentially having pressurized compartments, such as aircraft, require a latching and locking system that will both latch the door to maintain the door in a closed position and lock the latches to maintain the door in a locked position throughout the duration of the flight. These locking systems typically have latches that interface with the surrounding frame to hold the door in the closed position and locks that lock the latches to ensure they stay in the latched position. In some systems, this may necessitate a user to actuate each locking member individually. In yet other systems, a user may actuate one portion of the latching and locking system, such as a handle, which will cause actuation of the two or more locking members at the same time. Regardless, safety protocols require the user confirm that the locking members are in in the locked position when the door is closed and locked by direct visual inspection. Typically, visual inspection is performed through windows located at the site of each locking member. Such placement of the window for visual inspection is inconvenient for some crew members, such as pilots, who may have aircraft components such as the seat, that block their view of the windows.

Additionally, prior locking mechanisms may have a pre-catch mechanism that prevents the locking members from extending outwardly until the door is closed. However, these prior art pre-catch mechanisms typically have one or more biasing members (e.g., springs) that bias the locking members towards a pre-catch position (i.e., away from the airframe) even when the door is locked. Such a configuration is not ideal, as it is not desirable to have any mechanisms biasing the locking members away from a locked position when the door is to be locked.

What is needed in the art is a door latching and locking mechanism having lock indication windows that are visible to crew members yet remote from the site of the locking mechanism. Additionally, the lock indication window should be placed where a crew member, such as a pilot or co-pilot, can easily view the lock indication window when seated in the cockpit. What is also needed in the art is a latch positioning mechanism that retains the locking members of the door in a pre-catch position (i.e., within the door) until the door is securely closed within the airframe, but does not bias the locking members towards the pre-catch position upon closing and locking of the door. Such a latch positioning mechanism would prevent the latching members from blocking the closing of the door while also not biasing the locking members towards the pre-catch position upon closing of the door.

The flag mechanism utilizes bellcranks and flags to visually notify the crew member at the single lock indication window of the mechanical location of the locking members of the door. The latch positioning mechanism utilizes a series of a frame bumper, rods, bell cranks, and cams to keep the latching and locking mechanism in a pre-catch position while the door is open. Furthermore, the latch positioning mechanism is automatically released upon closing of the door. This release occurs without user input, and is initiated by contact between portions of the latch positioning mechanism and the frame. Releasing of the latch positioning mechanism prevents biasing of the locking members towards a pre-catch position when the door is closed and/or locked. Additionally, the latch positioning mechanism is automatically reengaged following unlocking of the locking mechanism and/or opening of the door, thereby placing the locking members back into a pre-catch position.

FIG. 1 illustrates a vehicle 10 of some embodiments in which a door 100 may be located. The vehicle 10 may be a plane, helicopter, aircraft, boat, submarine, car, train, spacecraft, or any other vehicle that requires a latching and locking system within the door. While vehicle 10 may comprise any of the aforementioned options, vehicle 10 may be referred to as an aircraft for conciseness and clarity throughout the present disclosure. Vehicle 10 includes a frame 12 that surrounds the door 100. In embodiments, the door 100 is rotatably coupled to frame 12 such that it pivots around an axis to open or close in comparison to the frame 12. In embodiments, the frame 12 receives some or most of door 100 when in a closed position. As mentioned above, frame 12 may be configured to receive one or more locking members located in the door 100, allowing the door 100 to be locked to the frame 12. In some embodiments, frame 12 may be configured to receive two or more locking members. In yet other embodiments, frame 12 may be configured to receive two locking members.

Figure 2A:
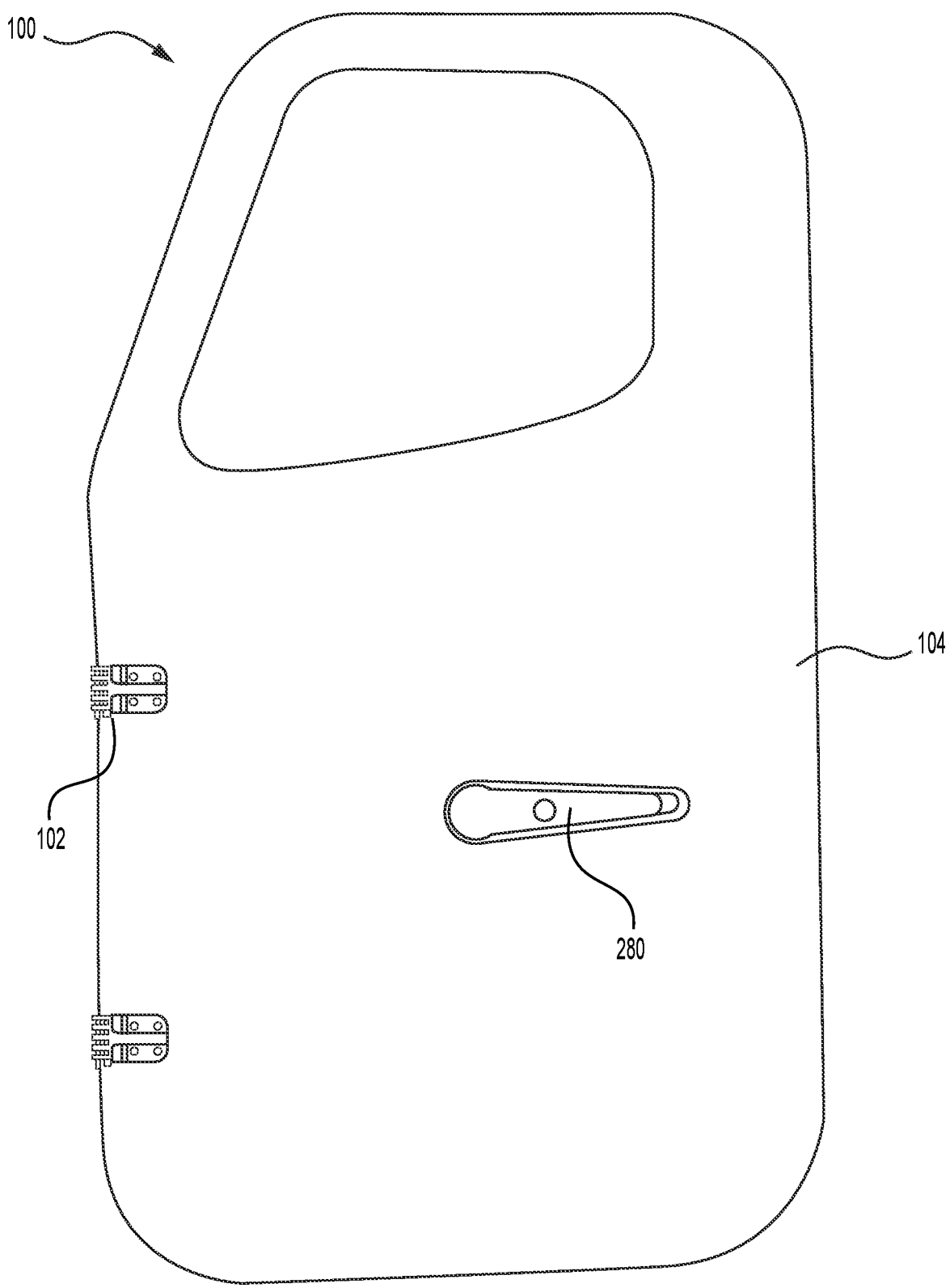
FIG. 2A illustrates an exterior view of a door in some embodiments.
Figure 2B:
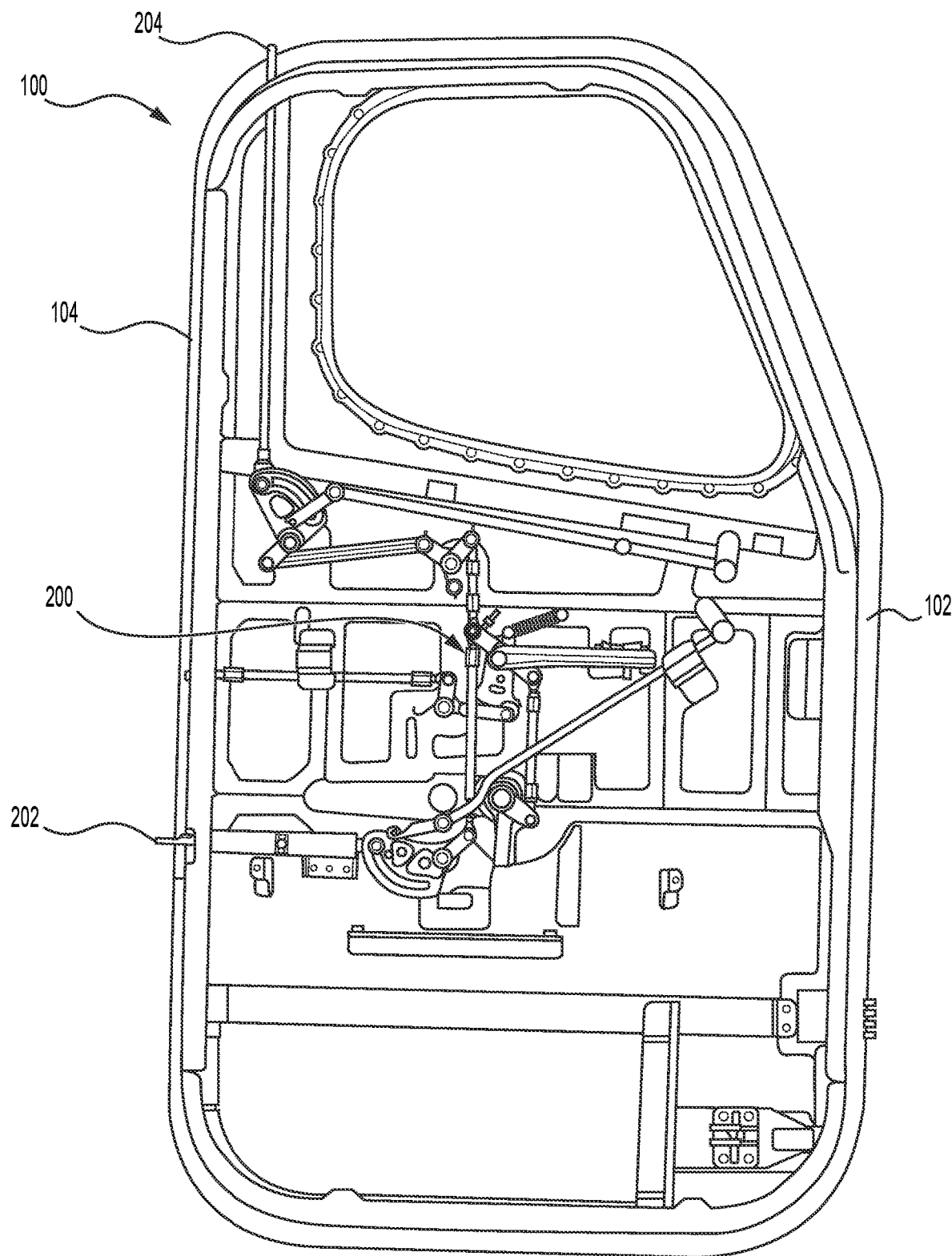
FIG. 2B illustrates an interior view of the door of FIG. 2A in some embodiments.

FIG. 2A depicts an exterior view of door 100 while FIG. 2B depicts an interior view of door 100 with some portions removed. As such, FIGS. 2A and 2B are best viewed together with the following description. In embodiments, door 100 is hingedly connected to frame 12 at a first side 102. Further, a second side 104 of door 100 swings outwardly from frame 12 when door 100 is open. Further, second side 104 is received by, or within, frame 12 when door 100 is closed. While first side 102 is depicted as being connected at the fore side and second side 104 depicted as being on the aft side, it is contemplated that first side 102 may be hingedly connected to any side of the vehicle 10.

As depicted in FIG. 2B, door 100 includes a latching and locking system 200. As will be described in greater detail below, latching and locking system 200 includes at least one latch. For example, in some embodiments, latching and locking system 200 includes a first latch 202 and a second latch 204. As described above, frame 12 may be configured to receive first latch 202 and second latch 204 when door 100 is latched and/or locked into frame 12. It is contemplated that frame 12 may have any variation of an indent, hole, lock, frame, etc. that is capable of receiving, or locking to, first latch 202 and second latch 204. As will be discussed in greater detail, latching and locking system 200 may include an exterior handle 280 accessible on the exterior side of door 100 (e.g., see FIG. 2A). Exterior handle 280 allows a user outside of aircraft 10 to unlock and open door 100.

Figure 3:
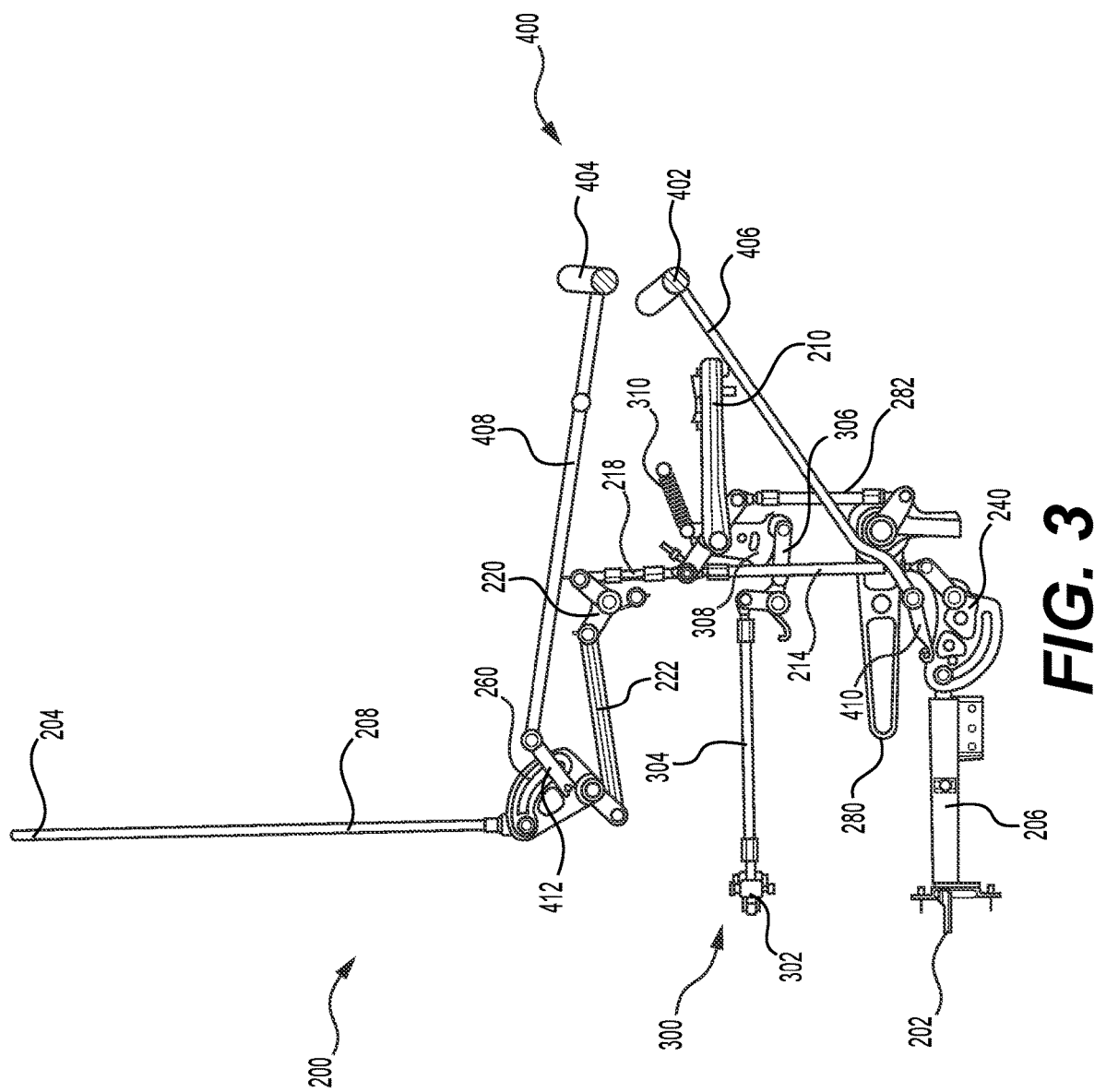
FIG. 3 depicts some embodiments of a latching and locking system included in the door of FIG. 2A.

FIG. 3 depicts latching and locking system 200, in some embodiments, with certain components of door 100 removed for clarity. In embodiments, door 100 includes a latching and locking system 200, a latch positioning mechanism 300 and a flag mechanism 400. As will be discussed in greater detail below, latch positioning mechanism 300 is configured to maintain locking members 202, 204 in a pre-catch position (i.e., within door 100) when door 100 is open, thereby allowing door 100 to be pulled into frame 12 (i.e., closed). Flag mechanism 400 is configured to notify a user of latching and locking system 200 and door 100 of the mechanical location of first latch 202 and second latch 204. While latch positioning mechanism 300 and flag mechanism 400 are described herein as separate systems within latching and locking system 200, it is to be understood that latch positioning mechanism 300 and flag mechanism 400 are both operatively connected within latching and locking system 200 such that certain components are shared between latch positioning mechanism 300 and flag mechanism 400.

As illustrated in FIG. 3, first latch 202 and second latch 204 are mechanically coupled within latching and locking system 200 via first latching rod 206 and second latching rod 208, respectively. In some embodiments, first latch 202 is an extension of first latching rod 206 and second latch 204 is an extension of second latching rod 208, the first and second locking members 202, 204 extending into frame 12 when latching and locking system 200 is in a locked position. For example, actuation of first latching rod 206 will drive first latch 202 towards or away from frame 12. Further, actuation of second latching rod 208 will drive second latch 204 towards or away from frame 12. As will be discussed in greater detail below, first latching rod 206 is driven by rotation of a first cam 240 while second latching rod 208 is driven by rotation of a second cam 260.

First cam 240 and second cam 260 are for example rotatable arcuate members configure to be driven (e.g., rotated) by actuation of a handle 210. For example, a portion of first cam 240 may be operatively connected to handle 210 via a first rod 214. In another example, second cam 260 may be operatively connected to handle 210 via a second rod 218, a rod bellcrank 220, and a third rod 222. In some embodiments, actuation of handle 210 may simultaneously actuate first rod 214 and second rod 218, allowing for concurrent actuation of first cam 240 and second cam 260 via a single user interface. Concurrent operation of first latching rod 206 and second latching rod 208 allows for first latch 202 and second latch 204 to be actuated towards, or away, from frame 12 simultaneously.

As will be described in greater detail below, rotation of first cam 240 and second cam 260 may also drive flag mechanism 400. For example, rotation of first cam 240 may cause engagement of a catch 410a (see FIGS. 7 and 8) with first cam 240, thereby driving movement of a first flag 402. In another example, rotation of second cam 260 may cause engagement of a catch 412a (see FIGS. 7 and 8) with second cam 260, thereby driving movement of a second flag 404. As illustrated and described above, first cam 240 actuates first latch 202 and first flag 402. Further, second cam 260 actuates second latch 204 and second flag 404. Accordingly, the location/position of first flag 402 is indicative of the mechanical location of first latch 202 while the location/position of second flag 404 is indicative of the mechanical location of second latch 204. As such, flag mechanism 400 allows a user to visually inspect and confirm the location/position of locking members 202, 204.

Figure 5:
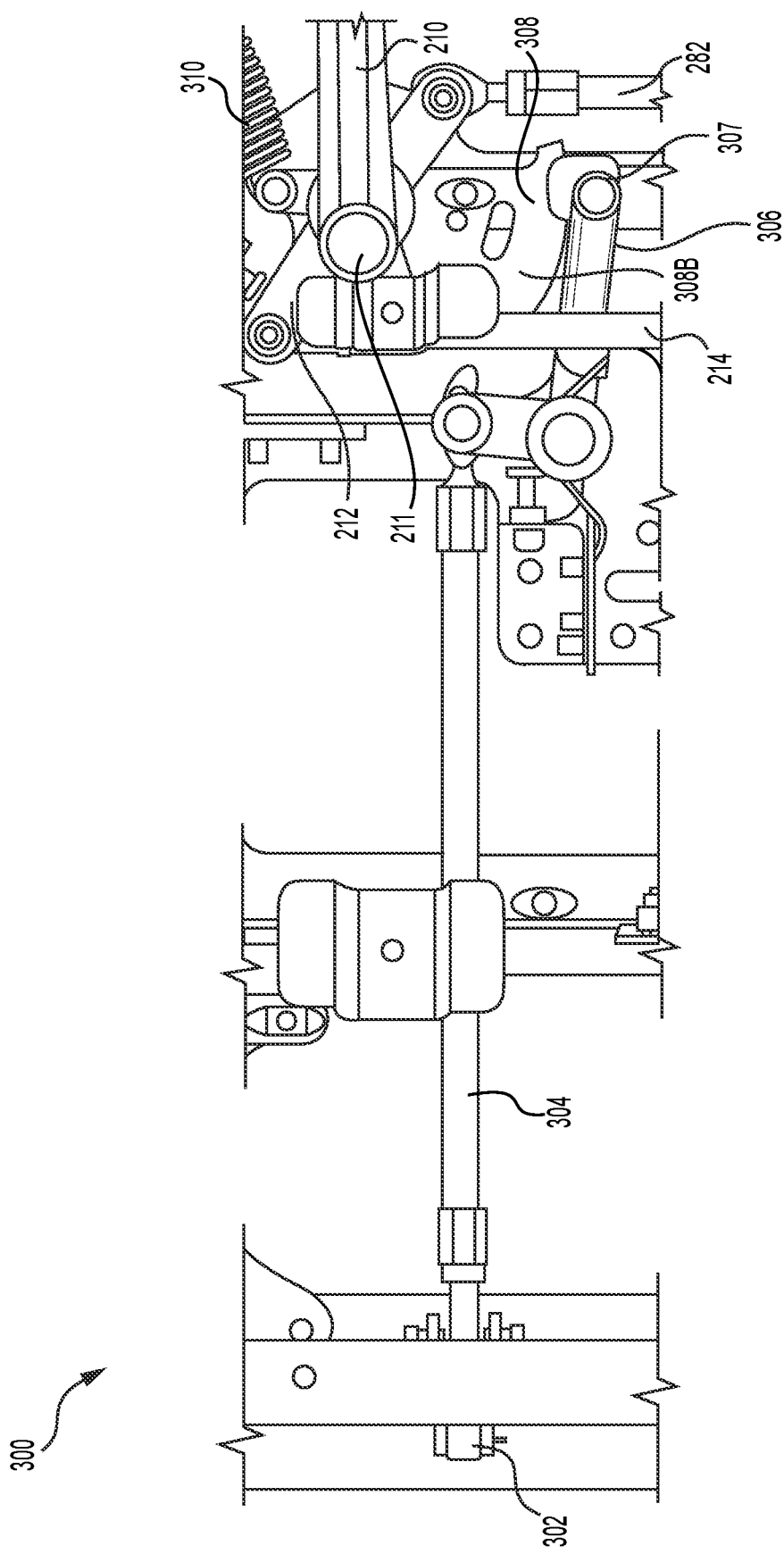
FIG. 5 depicts an interior view of the latch positioning mechanism of FIG. 4 in a released position, in some embodiments.
Figure 6:
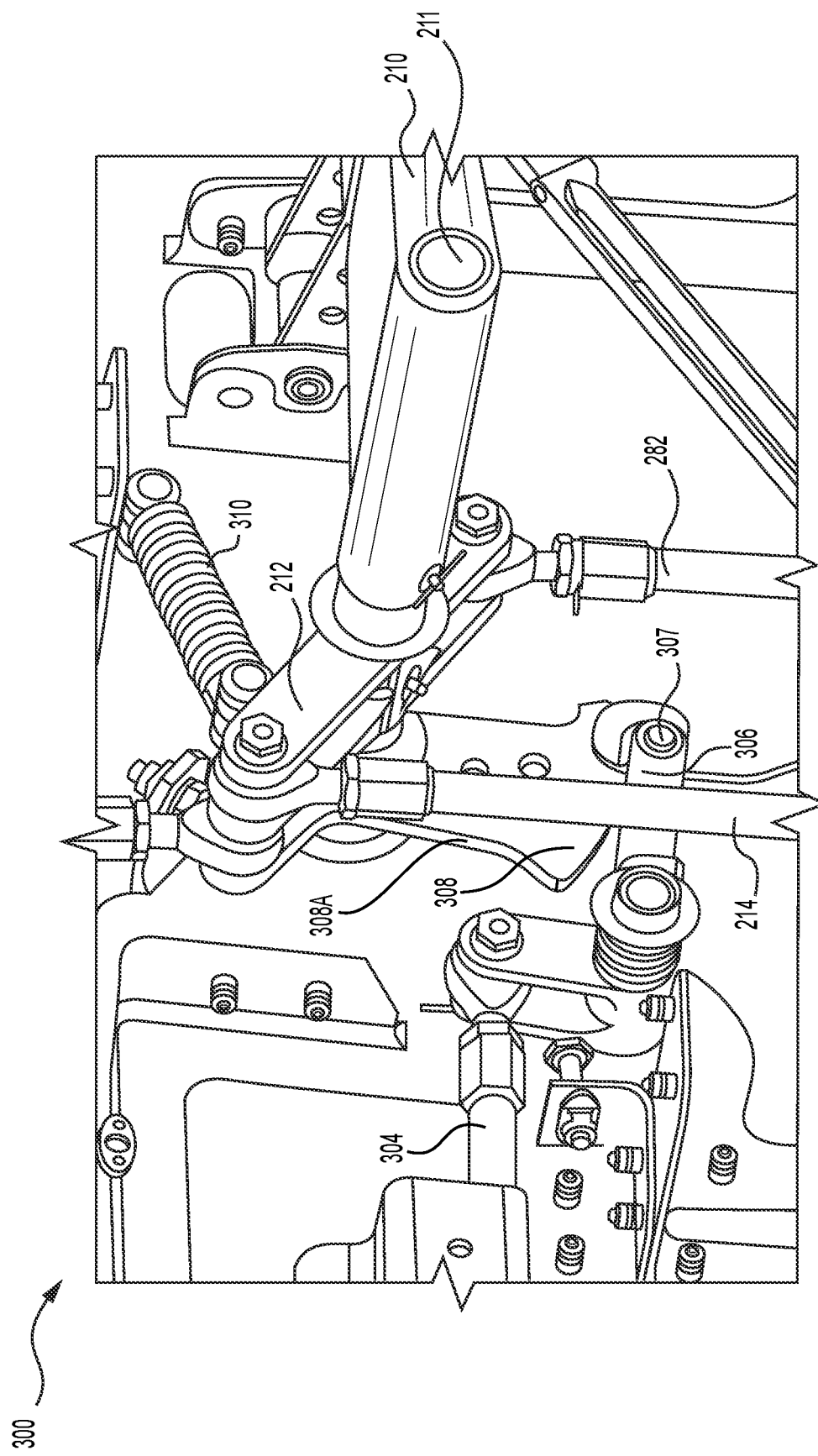
FIG. 6 depicts a side perspective view of the latch positioning mechanism of FIG. 4 in a released position, in some embodiments.

Operative connection of the latch positioning mechanism 300 within the latching and locking system 200 is depicted in FIG. 3, but will be described in greater detail below with reference to FIGS. 4-6.

Figure 4:
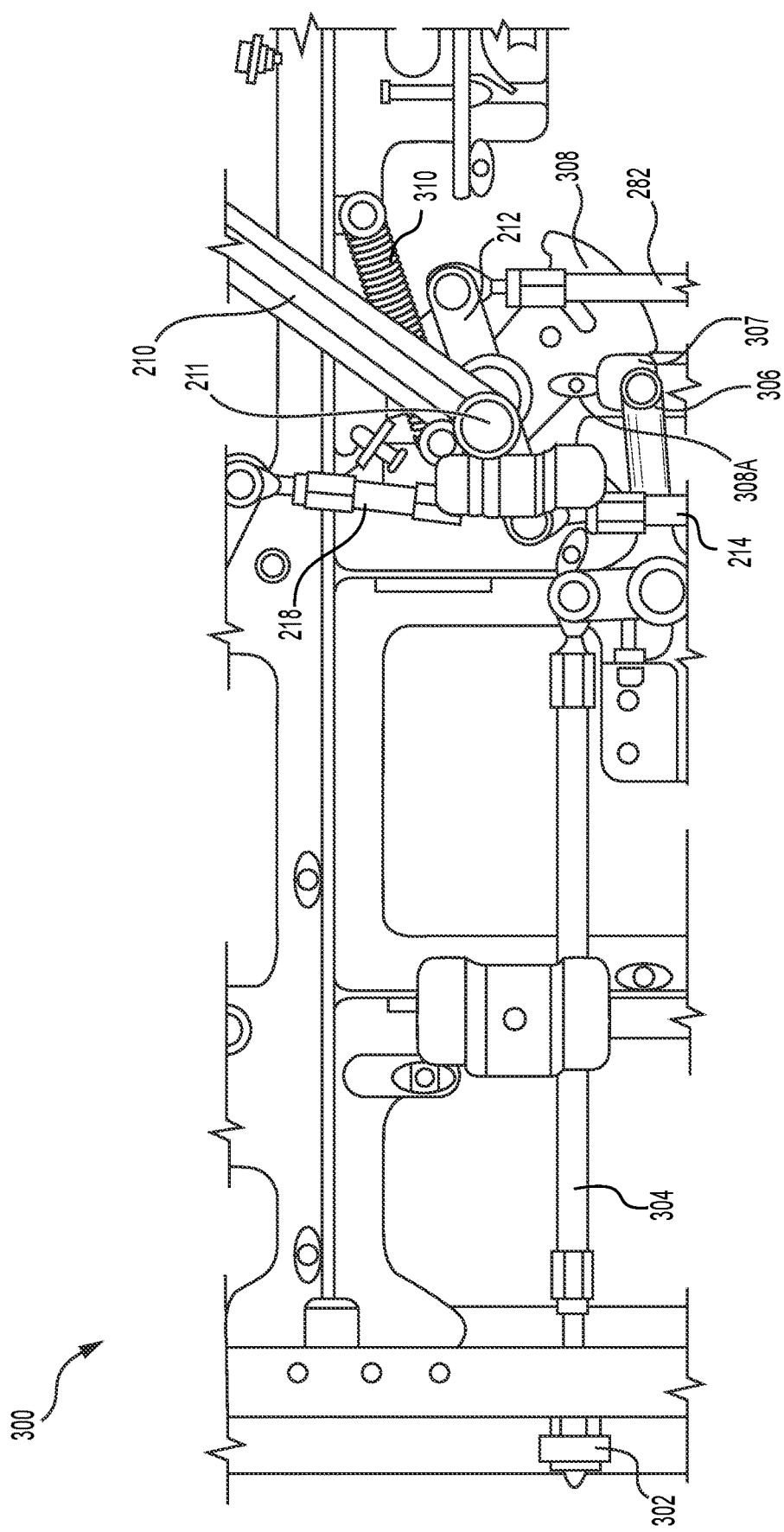
FIG. 4 illustrates some embodiments of a latch positioning mechanism of the door of FIG. 2A in a pre-catch position.

FIG. 4 illustrates some embodiments of latch positioning mechanism 300 in the pre-catch position (e.g., when door 100 is open). FIGS. 5-6 illustrate some embodiments of latch positioning mechanism 300 in the released position (e.g., when door 100 is closed or received within frame 12). Accordingly, FIGS. 4-6 are best viewed together for the following description.

Latch positioning mechanism 300 includes a push rod 304 having a frame bumper 302 on an end (see FIG. 3). In embodiments, the frame bumper 302 extends outwardly from door 100 such that when door 100 is shut within frame 12, frame bumper 302 comes into contact with at least a portion of the frame 12. For example, when door 100 is closed, frame bumper 302 may be displaced by contacting a portion of frame 12. Accordingly, frame bumper 302 and push rod 304 will be passively displaced towards first side 102 of door 100.

As shown in FIG. 4, in the pre-catch position, push rod 304 is mechanically coupled to a catch bellcrank 306, which operatively engages a catch cam 308 at a first side 308a. As illustrated in FIG. 6, first side 308a may be partially sloped towards catch bellcrank 306. Such sloping of first side 308a aids in maintaining catch bellcrank 306 pressing against first side 308a in the pre-catch position. Catch cam 308 may be rotatable about pivot pin 211. Further, in some embodiments, a portion of catch cam 308 may be attached to elastic member 310 (see FIGS. 5-6). Elastic member 310 may bias first side 308a of catch cam 308 towards catch bellcrank 306. Accordingly, when push rod 304 is actuated by contacting frame 12 at frame bumper 302, catch bellcrank 306 is driven towards and down from first side 308a. Movement of catch bellcrank 306 towards and down from first side 308a, in combination with elastic member 310 driving first side 308a towards catch bellcrank 306, causes rotation of catch cam 308 towards catch bellcrank 306 (e.g., in a clockwise direction as depicted in FIGS. 4-6). In some embodiments, the shape of first side 308a is such that catch bellcrank 306 may rotate with little to no rotation of catch cam 308 as a roller 307 located on catch bellcrank 306 slides along first side 308a. In some embodiments, roller 307 may be configured to slidably contact first side 308a and second side 308b of catch cam 308 as latch positioning mechanism 300 transitions between the pre-catch position and the released position. Accordingly, as catch cam 308 is rotated about pivot pin 211, roller 307 rides along a second side 308b of catch cam 308. Further, in some embodiments catch bellcrank 306 includes a biasing member (e.g., a torsion spring) that biases roller 307 upwards (e.g., biases catch bellcrank 306 in a counter-clockwise direction as depicted in FIG. 4).

In embodiments, catch cam 308 is mechanically coupled to pivot pin 211. Accordingly, rotation of catch cam 308 may additionally cause rotation of pivot pin 211. Further, pivot pin 211 is mechanically coupled to handle 210 and seesaw 212. As such, rotation of either of catch cam 308 or handle 210 may induce rotation of pivot pin 211 and subsequently seesaw 212. As such, the latch positioning mechanism 300 prohibits rotation of handle 210 while in the pre-catch position as rotation of catch cam 308 is prevented via contact of catch bellcrank 306. As illustrated between FIGS. 4 and 5, rotation of seesaw 212 actuates first rod 214 and second rod 218. For example, as illustrated, rotation of seesaw 212 in a clockwise direction around pivot pin 211 causes upward movement of first rod 214 and second rod 218. As will be discussed in greater detail below, upward movement of both first rod 214 and second rod 218 cause rotation of first cam 240 and second cam 260, respectively. As previously mentioned, rotation of first cam 240 and second cam 260 subsequently actuates first latch 202 and second latch 204 towards/into frame 12. As catch cam 308 is mechanically coupled to pivot pin 211, movement of locking members 202 and 204 is inhibited when catch cam 308 is prevented from rotating due to contact with catch bellcrank 306. When catch bellcrank 306 and catch cam 308 are held in the pre-catch position, as shown in FIG. 4, locking members 202 and 204 are prevented from extending outwardly from door 100. Because catch cam 308 is not released from the pre-catch position until frame bumper 302 contacts frame 12, locking members 202 and 204 cannot extend outwardly from door 100 until catch cam 308 is released, as is shown in FIGS. 5 and 6. Importantly, upon release of catch cam 308 and latch positioning mechanism 300, there is no mechanical biasing of locking members 202, 204 away from a locked position. It is also important to note that after the locking mechanism 200 is released from the pre-catch position by the latch positioning mechanism 300 and the elastic member 310 moves the locking mechanism 200 towards the latched and locked position, the door 100 is still not in a fully latched and locked configuration until further steps are taken by the user, such as actuating handle 210 which will be described in greater detail below.

Figure 7:
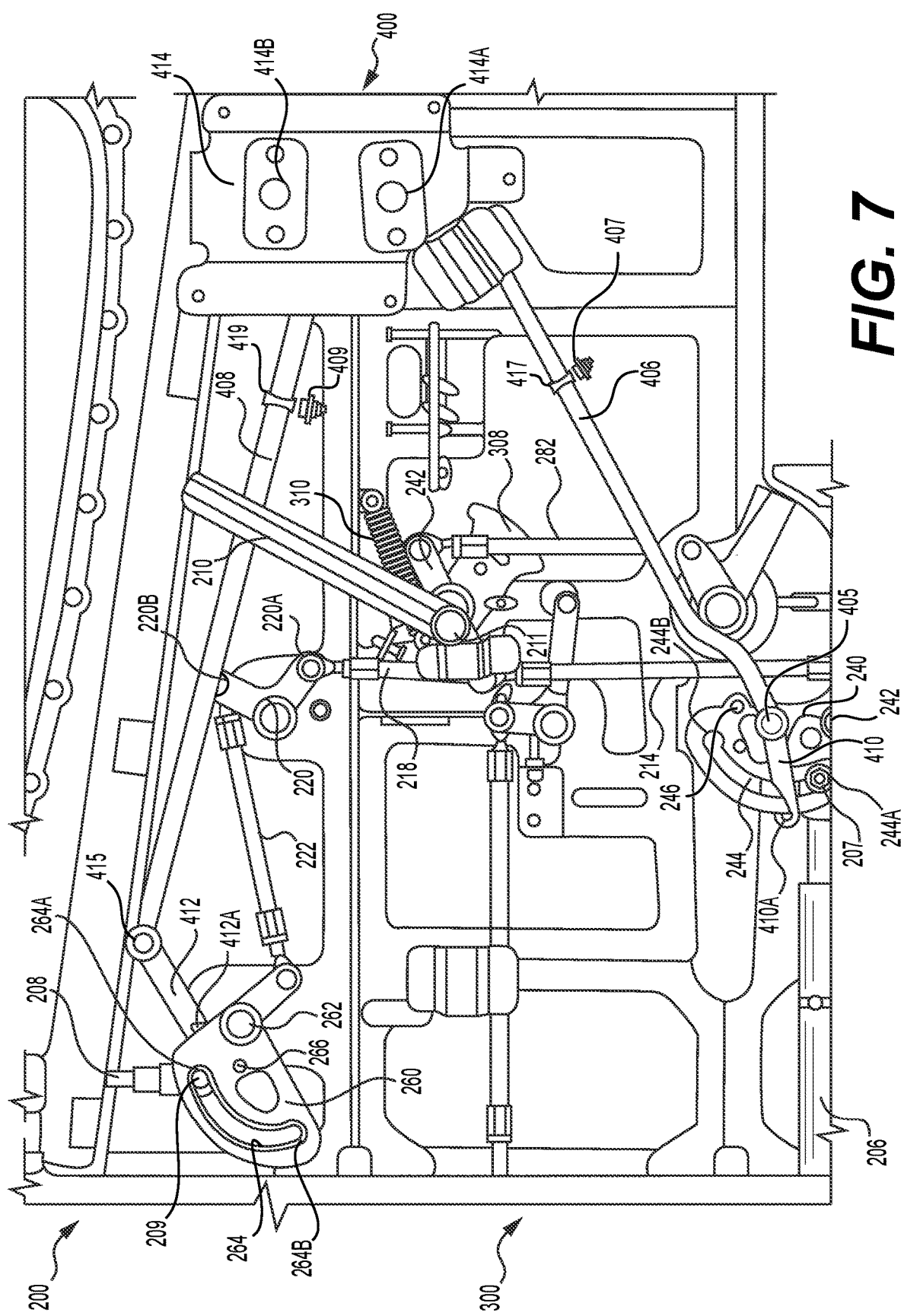
FIG. 7 illustrates a flag mechanism of some embodiments of the door of FIG. 2A in an unlocked position.
Figure 8:
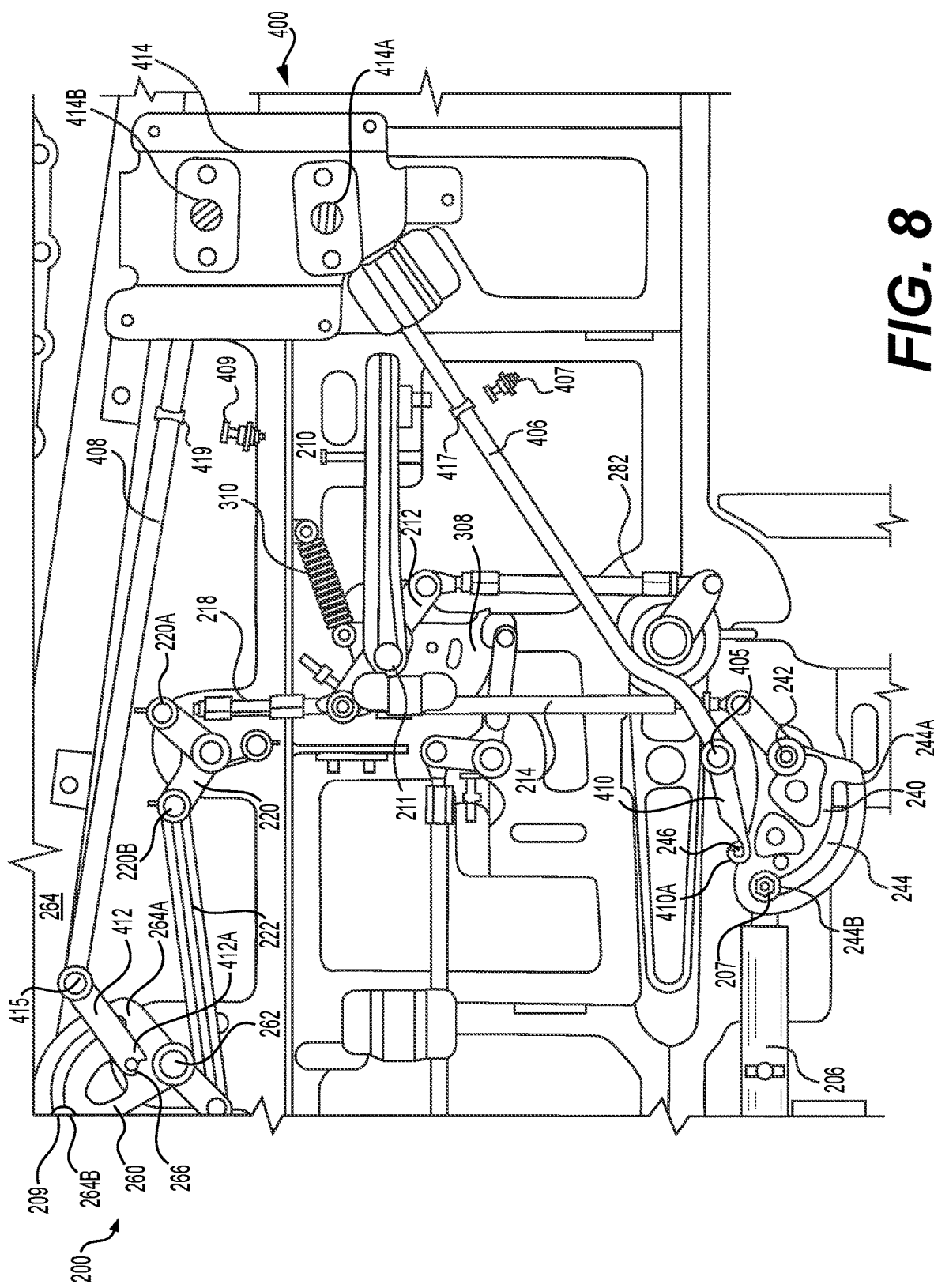
FIG. 8 illustrates the flag mechanism of FIG. 7 in some embodiments in a locked position.
Figure 9:
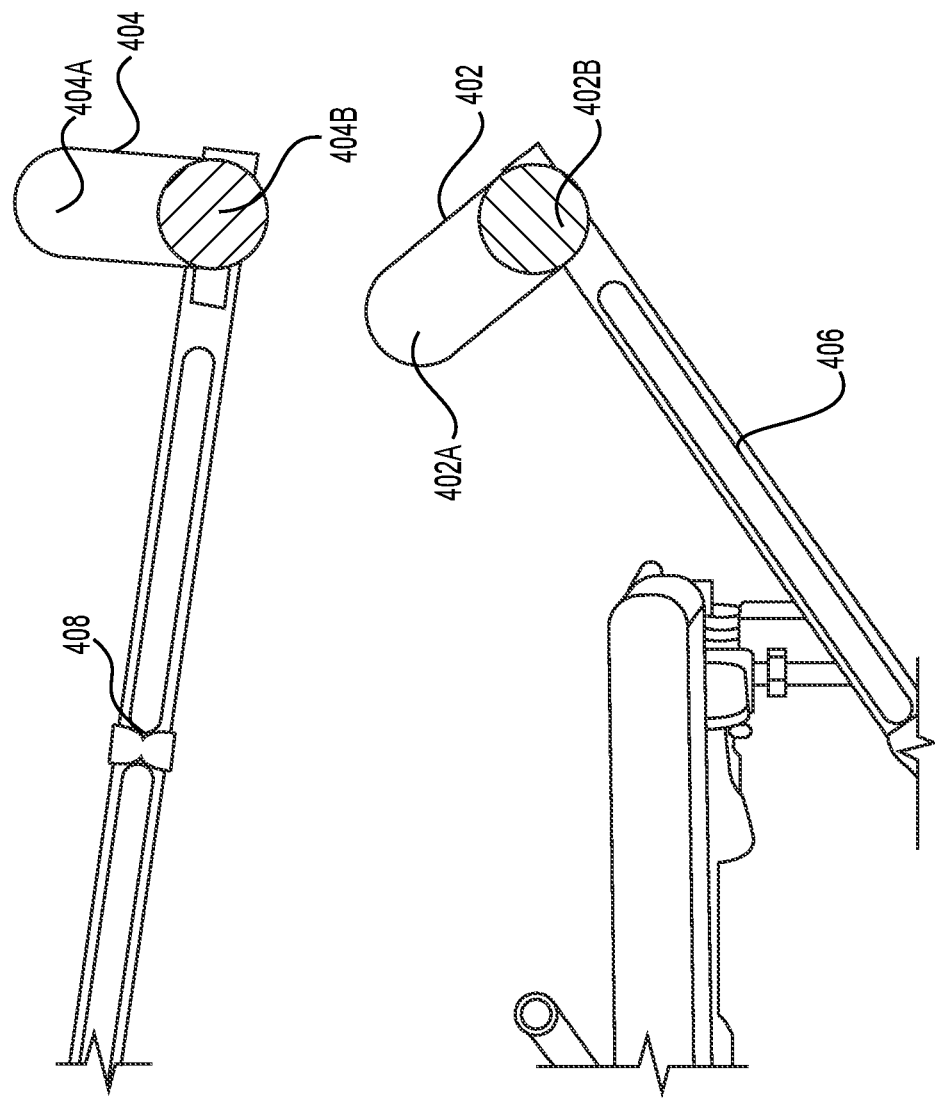
FIG. 9 depicts flags of the flag mechanism of FIG. 7, in some embodiments.

FIGS. 7-9 illustrate embodiments of the flag mechanism 400. Specifically, FIG. 7 illustrates embodiments of flag mechanism 400 in an unlocked position. FIG. 8 illustrates embodiments of flag mechanism 400 in a locked position. FIG. 9 illustrates embodiments of the flags 402, 404 of flag mechanism 400. Accordingly, FIGS. 7-9 are best viewed together with the following description.

As illustrated in FIG. 7, when in the unlocked position, handle 210 has not been actuated from a first position (e.g., not horizontal) to a second position (e.g., substantially horizontal, see FIG. 8). When handle 210 is in the first position, seesaw 212 is oriented such that first rod 214 and second rod 218 are substantially down, and first rod 214 has not yet driven rotation of first cam 240 around first cam pivot point 242. Similarly, when handle 210 is in the first position, second rod 218 (via rod bellcrank 220 and third rod 222) has not yet actuated rotation of second cam 260 around second cam pivot point 262. As first cam 240 and second cam 260 are operatively and slidably coupled to first latch 202 and second latch 204 via first latching rod 206 and second latching rod 208, respectively, when handle 210 is in the first position as shown in FIG. 7, locking members 202, 204 are not fully received by frame 12.

As described above, when the door 100 is actuated into or substantially in frame 12, the latch positioning mechanism 300 will be actuated (i.e., released) due to contact of the frame bumper 302 with the surround frame 12. In some embodiments, this will release catch cam 308 as discussed above. This allows a user to actuate components of the latching and locking system 200 and place the latching and locking system 200 in a latched and locked position, as will be discussed below.

Following closing, door 100 is ready to be placed into a latched and locked position. Accordingly, a user within aircraft 10 may actuate handle 210. As depicted in FIG. 8, actuation of handle 210 in a downward direction to the second position may place the latching and locking system 200 in the locked position. As depicted, rotation of handle 210 around pivot pin 211 causes rotation of seesaw 212 in the same direction as handle 210. Such rotation of seesaw 212 actuates both first rod 214 and second rod 218. In some embodiments, both first rod 214 and second rod 218 are actuated in an upwards direction. As mentioned above, actuation of the first rod 214 and second rod 218 causes rotation of first cam 240 and second cam 260. In some embodiments, biasing members located within latching and locking system 200 may maintain handle 210 in the second position. For example, elastic member 310 acting on catch cam 308 and subsequently pivot pin 211 biases handle 210 in the second position. Additionally, torsional biasing members may be disposed on rod bellcrank 220 and first cam 240, which bias first rod 214 and second rod 218 in the upward, locked position. Accordingly, in some embodiments the force of one or more of the aforementioned biasing members must be overcome by a user of door 100 to actuate the handle 210 from the second position (i.e., latched and locked position) to the first position (i.e., unlatched and unlocked).

Actuation of first rod 214 may cause rotation of first cam 240 around first cam pivot point 242. As briefly mentioned above, first latching rod 206 is slidably and operatively coupled to first cam 240. In embodiments, first latching rod 206 includes a pin 207 that is received within a first cam slot 244. As depicted, first cam slot 244 is substantially rounded, having a first end 244a and a second end 244b. In embodiments, the arc of first cam slot 244 is such that first end 244a is shorter distance from first cam pivot point 242 than second end 244b is from first cam pivot point 242. Accordingly, as pin 207 slidably transitions within first cam slot 244 from first end 244a to second end 244b, pin 207 and first latching rod 206 are substantially actuated. In some embodiments, transition of pin 207 from first end 244a to second end 244b actuates first latching rod 206 horizontally, thereby causing first latch 202 to be received within surround frame 12.

Rotation of first cam 240 about first cam pivot point 242 further actuates first flag 402 of flag mechanism 400. For example, in some embodiments, first cam 240 includes a stud 246. Stud 246 extends transversely outward from first cam 240. More specifically, stud 246 may extend from first cam 240 transversely in relation to the rotational plane of first cam 240. In embodiments, stud 246 is configured to be "caught", or received by catch 410a disposed on an end of a short arm 410. Turning to FIG. 7, stud 246 and catch 410a are depicted with a gap therebetween prior to rotation of first cam 240. As illustrated in FIG. 8, when first cam 240 is rotated (e.g., in a counterclockwise direction), stud 246 is received by catch 410a such that catch 410a and stud 246 are in direct contact with each other. The rotation of first cam 240 thereby causes rotation of short arm 410 and long arm 406 about a pivot point 405. In embodiments, stud 246 is received within catch 410a prior to full rotation of first cam 240. Accordingly, when stud 246 is received within catch 410a, first cam 240 continues to rotate, thereby actuating catch 410a and short arm 410.

In some embodiments, one or more of catch 410a, short arm 410, and/or long arm 406 may be transiently maintained such that catch 410a is in the direct path of stud 246 as first cam 240 rotates. For example, catch 410a, short arm 410, and/or long arm 406 may be held in place via a bracket, shelf, stopper, magnet, or any other means that may maintain the position of catch 410a while still allowing movement therefrom when stud 246 contacts catch 410a. As depicted in FIGS. 7 and 8 and described below, long arm 406 may be held in place via a stop bolt 407.

Actuation of short arm 410 further leads to actuation of long arm 406. Such movement of long arm 406 actuates flag 402. As depicted in FIGS. 7 and 7, flag mechanism 400 includes a lock indication window 414. In some embodiments, lock indication window 414 includes a first flag window 414a and a second flag window 414b. First flag window 414a may allow an onlooker from within aircraft 10 (e.g., a pilot in the cockpit) to view portions of first flag 402 while second flag window 414b may allow the same onlooker from within aircraft 10 to view portions of second flag 404. Lock indication window 414, therefore, is configured to allow for visual inspection of the mechanical state of components of latching and locking system 200 via the positioning of flags 402, 404. For example, as illustrated in FIG. 9, first flag 402 comprises a first indicator 402a and a second indicator 402b. Similarly, second flag 404 includes a first indicator 404a and a second indicator 404b. First indicators 402a, 404a may be distinguished from second indicators 402b, 404b via any means commonly known to one skilled in the art. For example, first indicators 402a, 404a may be a different color, reflection, pattern, material, etc. to allow the onlooker to distinguish first indicators 402a, 404a from second indicators 402b, 404b. As can be seen in FIGS. 7-7, first and second flag windows 414a, 414b may be configured such that an onlooker can only see either first indicator 402a, 404a or second indicator 402b, 404b. In the example depicted, first and second flag windows 414a, 414b are substantially circular in shape while first and second flags 402, 404 are substantially elongated in shape. Further, in the example depicted, the long plane of the elongated shape is directed substantially along the same plane that flags 402, 404 are adjusted along when actuated by first and second cams 240, 260. While circular and elongated shapes of flag windows 414a, 414b and flags 402, 404, respectively, are depicted, it is contemplated that windows 414a, 414b and flags 402, 404 may consist of any shapes that allow for clear visual distinction between the position of first indicator 402a, 404a and second indicator 402b, 404b within windows 414a, 414b. As will be further discussed below, if first indicators 402a, 404a of flag mechanism 400 are viewed through flag windows 414a, 414b, this indicates to the onlooker that latching and locking system 200 is in an unlatched/unlocked position. Alternatively, if second indicator 402b, 404b of flag mechanism 400 are viewed through flag windows 414a, 414b, this indicates to the onlooker that latching and locking system 200 is in a latched and locked position.

Referring back to FIG. 8, rotation of first cam 240 and stud 246 causes stud 246 to be received within and actuate catch 410a, which subsequently actuates short arm 410, long arm 406, and flag 402. In some embodiments, such actuation of flag 402 changes the viewable portion of flag 402 through first flag window 414a from the first indicator 402a to the second indicator 402b. As mentioned above and is apparent from the preceding description, viewing of second indicator 402b through first flag window 414a indicates that first latching rod 206 and first latch 202 are actuated towards, and into surround frame 12.

Counter-rotation of first cam 240 about first cam pivot point 242 allows first flag 402 of flag mechanism 400 to be returned from the position shown in FIG. 8 back to the position shown in FIG. 7. In embodiments, long arm 406 and short arm 410 are configured for gravity to pull long arm 406 downward to return flag 402 back to the FIG. 7 position. Long arm 406 is longer and heavier than short arm 410; therefore, the long arm 406 is biased by gravity to rotate about pivot point 405 in a clockwise direction when catch 410a is free of stud 246. A stop bolt 407 may be disposed beneath a portion of long arm 406 to support the long arm 406 when it is not engaged with first cam 240 cam via 246 stud. In some embodiments, a relatively weak magnet 417 is added to long arm 406 for holding long arm 406 against stop bolt 407 to prevent long arm 406 from bouncing up and down. The magnet 417 is weak enough to enable long arm 406 to rotate via stud 246 when first cam 240 is rotated. Alternatively, a weak spring may be disposed between stop bolt 407 and long arm 406 to transiently maintain long arm 406 downward against stop bolt 407 when not actuated via first cam 240.

Actuation of second latch 204 and second flag 404 may, in some embodiments, be similar to first latch 202 and first flag 402, with slight variations. As mentioned above, actuation of handle 210 causes rotation of seesaw 212 around pivot pin 211. Such movement of seesaw 212 causes second rod 218 to be displaced in an upwards direction. The opposing end of second rod 218 is operatively coupled to rod bellcrank 220 at a first end 220a. As illustrated in FIG. 8, displacement of first end 220a via second rod 218 causes rod bellcrank 220 to rotate (e.g., in a counterclockwise direction). Rod bellcrank 220 is further operatively coupled to third rod 222 at a second end 220b. In embodiments, rotation of rod bellcrank 220 actuates third rod 222.

As mentioned above, third rod 222 is coupled to second cam 260. As such, actuation of third rod 222 causes rotation of second cam 260 around second cam pivot point 262 (e.g., in a clockwise direction). Second cam 260 is slidably and operatively connected to second latching rod 208 (see FIGS. 3 and 7). In some embodiments, second latching rod 208 includes pin 209 that is received by and slidably coupled to second cam slot 264. Similar to first cam slot 244, second cam slot 264 includes a first end 264a and a second end 264b. In embodiments, the arc of second cam slot 264 is such that second end 264b extends at a further distance from second cam pivot point 262 than does first end 264a. Accordingly, transition of pin 209 from first end 264a to second end 264b causes actuation of second latching rod 208. Such actuation of second latching rod 208 via second cam 260 will subsequently drive second latch 204 into a portion of frame 12, thereby placing it in a locked position, as shown in FIG. 8.

Similar to first cam 240, second cam 260 includes a stud 266 extending outwardly therefrom. In embodiments, stud 266 extends in an outward direction from second cam 260 transversely in comparison to the rotational plane of second cam 260. Stud 266 is configured to be "caught" or received within catch 412a located on an end of short arm 412. Catch 412a may be placed such that stud 266 is received therein while second cam 260 has a further distance to rotate. In some embodiments, one or more of catch 412a, short arm 412, and/or long arm 408 may be transiently maintained such that catch 412a is in the direct path of stud 266 as second cam 260 rotates (e.g., in the clockwise direction). For example, catch 412a, short arm 412, and/or long arm 408 may be held in place via a bracket, shelf, stopper, magnet, or any other means that may maintain the position of catch 412a while still allowing movement therefrom when stud 266 contacts catch 412a. Accordingly, further rotation of second cam 260 will actuate catch 412a and short arm 412. Actuation of short arm 412 will further cause movement of long arm 408 and subsequently of second flag 404.

Movement of second flag 404 may subsequently alter the viewable portion of second flag 404 through second flag window 414b. For example, in an unlocked position (i.e., FIG. 7) first indicator 404a may be viewable through second flag window 414b. However, when latching and locking system 200 transitions to the locked position (i.e., FIG. 8), the position of second flag 404 may be adjusted such that second indicator 404b is viewable through second flag window 414b. Therefore, as mentioned above and is apparent from the preceding description, viewing of second indicator 404b through second flag window 414b indicates to the onlooker that second latch 204 has been mechanically adjusted into a locked position (e.g., driven into frame 12).

Similar to first cam 240, counter-rotation of second cam 260 about second cam pivot point 262 allows second flag 404 to be returned from the position shown in FIG. 8 back to the position shown in FIG. 7. In embodiments, long arm 408 and short arm 412 are configured for gravity to pull long arm 408 downward to return flag 404 back to the FIG. 7 position. Long arm 408 is longer and heavier than short arm 412; therefore, the long arm 408 is biased by gravity to rotate about a pivot point 415 in a clockwise direction when catch 412a is free of stud 266. A stop bolt 409 may be disposed beneath a portion of long arm 408 to support the long arm 408 when it is not engaged with second cam 260 via 266 stud. In some embodiments, a relatively weak magnet 419 is added to long arm 408 for holding long arm 408 against stop bolt 409 to prevent long arm 408 from bouncing up and down. The magnet 419 is weak enough to enable long arm 408 to rotate via stud 266 when second cam 260 is rotated. Alternatively, a weak spring may be disposed between stop bolt 409 and long arm 408 to transiently maintain long arm 408 downward against stop bolt 409 when not actuated via second cam 260.

Importantly, some or all of the steps described above may be reversed to move latching and locking system 200 and door 100 from the locked position (i.e., FIG. 8) to the unlocked position (i.e., FIG. 7). For example, handle 210 may be moved from the second position (e.g., FIG. 8) to the first position (e.g., FIG. 7). Such a movement causes seesaw 212 to rotate in a similar direction as handle 210, thereby lowering both first rod 214 and second rod 218. Lowering of first and second rods 214, 218 causes rotation of first cam 240 and second cam 260 in a opposite direction than as previously described. This rotation would simultaneously release first latch 202 and second latch 204 while also releasing first flag 402 and second flag 404. As such, an onlooker within aircraft 10 viewing first and second windows 414a, 414b would see first indicators 402a, 404a, thereby indicating that latching and locking system 200 has moved into an unlocked position.

Also importantly, movement of handle 210 from the second position (e.g., FIG. 8) to the first position (e.g., FIG. 7) may move latch positioning mechanism 300 from the released position (e.g., FIGS. 5 and 6) to the pre-catch position (e.g., FIG. 4). For example, as discussed above, rotation of handle 210 from the second position to the first position will drive rotation of catch cam 308 in a counterclockwise direction via and around pivot pin 211, as depicted. Accordingly, roller 307 will slide along second side 308b until second side 308b transitions into first side 308a. Once reached, catch bellcrank 306 will rotate (e.g., in a counterclockwise direction) such that roller 307 is substantially contacting first side 308a (e.g., FIG. 4). As such, the latch positioning mechanism 300 is placed into the pre-catch position, thereby preventing movement of the first and second locking members 202, 204 until the latch positioning mechanism 300 is released.

As briefly mentioned above with reference to FIG. 2A, latching and locking system 200 may further include an exterior handle 280 that allows an individual located outside of aircraft 10 to release latching and locking system 200 from the locked position. For example, exterior handle 280 may be operatively connected to rod 282 (see FIGS. 7-8). As illustrated, rod 282 may be operatively connected to exterior handle 280 at a first end and connected to seesaw 212 at a second end. Accordingly, a user may rotate, press, release, or otherwise actuate exterior handle 280 which in turn may drive movement of rod 282. As illustrated, upward movement of rod 282 will actuate rotation of seesaw 212 away from the locked position (e.g., in the counterclockwise direction). Such rotation of seesaw 212 will subsequently drive first and second rods 214, 218 in the downward direction, thereby driving locking members 202, 204 out of frame 12.

It is noted that in the aforementioned descriptions of embodiments, directional descriptions such as clockwise, counterclockwise, horizontal, vertical, etc. are used merely for descriptive purposes only in relation to the illustrated figures. It is contemplated that other directions are used or understood to be used in certain circumstances. For example, clockwise and counterclockwise may be used interchangeably depending on which side of aircraft 10 door 100 is disposed or the arrangement of certain components within door 100. Similarly, horizontal and vertical may be exchanged depending on the orientation of the components within door 100. For example, it is contemplated that first latching rod 206 and first latch 202 may be arranged in a vertical direction rather than a horizontal direction. Furthermore, it is contemplated that second latching rod 208 and second latch 204 may be arranged in a horizontal direction rather than a vertical direction. Accordingly, any number of directions and descriptions of movement of components may be used without departing from the scope of the present disclosure.

FIG. 10 depicts a process-flow diagram illustrating a door locking method 500 using the latching and locking system 200 of FIGS. 1-9, in some embodiments. At step 502, a door is actuated into, or substantially into, a surround frame. In an example of step 502, a crew member, pilot, or user of airplane 10 actuates (e.g., pulls) door 100 into frame 12 (i.e., closes) such that the exterior of the door 100 is substantially flush with the exterior of frame 12.

At step 504, a latch positioning mechanism is actuated and released. In an example of step 504, latch positioning mechanism 300 is actuated when door 100 is received within frame 12. For example, frame bumper 302 may contact an interior portion of surround frame 12, thereby passively actuating components of latch positioning mechanism 300. Upon contact of frame bumper 302, push rod 304 may be displaced towards catch bellcrank 306, thereby causing downward rotation of roller 307 located on catch bellcrank 306. Such rotation of catch bellcrank 306 allows catch cam 308 to rotate towards catch bellcrank 306 (e.g., in a clockwise direction as depicted in FIG. 5) due to elastic member 310 biasing catch bellcrank 306 in such a way. Rotation of catch bellcrank 306 repositions roller 307 from first side 308a to second side 308b of catch cam 308, thereby moving the latch positioning mechanism 300 out of the pre-catch position and into the released position, thereby allowing latching and locking system 200 to be actuated in ways as previously described.

In a step 506, latching and locking members are actuated. In an example of step 506, a user may actuate handle 210, thereby driving a series of components of latching and locking system 200 to cause locking members 202, 204 to be fully received within or coupled to frame 12. For example, rotation of handle 210 into a second position causes seesaw 212 to rotate in the same direction (e.g., clockwise) around pivot pin 211. Rotation of seesaw 212 drives first and second rods 214, 218. Such movement of first and second rods 214, 218 causes rotation of first and second cams 240, 260 around first cam pivot point 242 and second cam pivot point 262, respectively. Once first and second cams 240, 260 are fully rotated, pin 207 moves completely from first end 244a to second end 244b and pin 209 moves completely from first end 264a to second end 264b. Accordingly, first latching rod 206 and second latching rod 208 are fully actuated such that locking members 202, 204 are fully received within surround frame 12, thereby placing door 100 in a locked position.

In a step 508, a flag mechanism is actuated. In an example of step 508, during rotation of first and second cams 240, 260, studs 246, 266 are received within catches 410a, 412a, thereby actuating flags 402, 404. For example, as first cam 240 rotates about first cam pivot point 242, stud 246 is received within catch 410a. This drives short arm 410 and long arm 406, thereby displacing first flag 402. Displacement of first flag 402 may cause the viewable portion of first flag 402 through first flag window 414a to switch from first indicator 402a to second indicator 402b. In another example, as second cam 260 rotates about second cam pivot point 262, stud 266 is received within catch 412a. This drives short arm 412 and long arm 408, thereby displacing second flag 404. Displacement of second flag 404 may cause the viewable portion of second flag 404 through second flag window 414b to switch from first indicator 404a to second indicator 404b.

It is noted that while locking method 500 is depicted as sequential, two or more steps may take place simultaneously or mostly simultaneously. For example, step 502 may passively cause step 504 to occur at almost the same time by the frame bumper 302 coming into contact with frame 12. Additionally, certain aspects of steps 506 and 508 may occur concurrently. For example, rotation of first and second cams 240, 260 simultaneously drives first and second locking members 202, 204 into frame 12 while also actuating components of flag mechanism 400.

As noted above, door 100 and latching and locking system 200 provide substantial benefits to users of an aircraft or other vehicle needing a safety lock mechanism within the doors. For example, latch positioning mechanism 300 provides a substantial benefit as it lacks any biasing members (e.g., springs) that bias any portion of latching and locking system 200 away from a locked position when door 100 is closed and/or locked. Instead, latch positioning mechanism 300 biases the locking members 202, 204 towards a pre-catch position only while the door is open. Upon closure, the latch positioning mechanism 300 is automatically and passively released, thereby no longer holding latching and locking system 200 in the pre-catch position. Such a system is an improvement on prior art mechanisms, that continue to bias the locking members away from a locked position when the door is closed and/or locked. These prior art mechanisms may cause safety risks as such biasing away from the locked position is not preferable while the vehicle is operated. Furthermore, flag mechanism 400 provides substantial benefits to the user as they are capable of visually confirming the mechanical location of multiple locking members in one location (i.e., lock indication window 414). For example, such capabilities may be especially advantageous for pilots who have a limited visual field of the inner doors when seated in the cockpit. Moreover, flag mechanism 400 is completely reliant upon mechanical systems to identify the position of the locking members. Therefore, flag mechanism 400 is not reliant upon electrical, wireless, or other non-mechanical systems which could, if broken, display a false-positive location of the locking members, thereby leading the crew member to believe the door is fully locked when it is in fact not locked.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

What is claimed is:

1. A latch positioning mechanism for a door of an aircraft configured to retain a latching and locking system of the door in a pre-catch position when the door is open, and release the latching and locking system from the pre-catch position when the door is closed, the latch positioning mechanism comprising:
   a pivot pin operatively connected to one or more locking members, wherein the one or more locking members are configured to be partially driven into a frame around the door via rotation of the pivot pin;
   a frame bumper configured to extend outside of the door in the pre-catch position for contacting the frame surrounding the door;
   a catch bellcrank operatively coupled to the frame bumper;
   a biasing member operatively coupled to the catch bellcrank, wherein the biasing member biases rotation of the catch bellcrank to bias the frame bumper into the pre-catch position;
   a catch cam operatively coupled to the pivot pin, wherein the catch bellcrank is configured to contact the catch cam when the catch bellcrank is biased into the pre-catch position such that the catch cam prevents release of the one or more locking members for locking the door; and
   the frame bumper is configured to contact the frame upon the door being closed thereby counterrotating the catch bellcrank to overcome the biasing member and release the catch cam enabling the one or more locking members to be moved into a locked position.

2. The latch positioning mechanism of claim 1, comprising an indoor handle operatively coupled to the catch cam and the one or more locking members via the pivot pin, wherein upon the catch cam being released via the frame bumper, rotation of the indoor handle to an unlock position rotates the pivot pin thereby retracting the one or more locking members from the frame and enabling the frame bumper to reset to the pre-catch position via the biasing member when the door is opened.

3. The latch positioning mechanism of claim 2, wherein upon the catch cam being released via the frame bumper, rotation of the indoor handle to a lock position rotates the pivot pin thereby extending the one or more locking members into the frame for locking the door.

4. The latch positioning mechanism of claim 2, comprising an exterior handle operatively coupled to the indoor handle, the catch cam, and the one or more locking members via a rod and a see saw coupled to the pivot pin, such that the exterior handle is configured to retract and extend the one or more locking members when the one or more locking members have been released via the frame bumper.

5. The latch positioning mechanism of claim 2, wherein the catch cam is configured to prevent rotation of the indoor handle while in the pre-catch position due to contact between the catch cam and the catch bellcrank.

6. The latch positioning mechanism of claim 1, wherein the frame bumper is operatively coupled to the catch bellcrank via a push rod.

7. The latch positioning mechanism of claim 1, wherein each of the one or more locking members is operatively coupled to the pivot pin via a push rod and a rotatable arcuate member.

8. The latch positioning mechanism of claim 1, comprising an elastic member operatively coupled to the catch cam for biasing the catch cam such that a first side of catch cam is biased towards the catch bellcrank.

9. The latch positioning mechanism of claim 8, wherein the elastic member is configured to rotate the catch cam out of the pre-catch position upon actuation of the frame bumper as the door is closing such that the catch cam is automatically released enabling the one or more locking members to be moved into the locked position.

10. The latch positioning mechanism of claim 8, wherein the first side of the catch cam is shaped to receive an exposed end of the catch bellcrank such that the catch cam is held in the pre-catch position when the frame bumper is extended while the door is open.

11. The latch positioning mechanism of claim 10, wherein the catch bellcrank comprises a roller on the exposed end configured to contact the first side of the catch cam in the pre-catch position, the roller being configured to roll along the first side of the catch cam to a second side of the catch cam when the frame bumper is actuated upon contact with the frame.

12. The latch positioning mechanism of claim 1, wherein the biasing member comprises a torsion spring that biases the catch bellcrank into the pre-catch position when the door is open.

13. The latch positioning mechanism of claim 1, wherein the biasing member rotates the catch bellcrank to bias the frame bumper and the catch cam into the pre-catch position thereby preventing release of the one or more locking members from extending out of the door and allowing the door to be pulled into the frame for closing the door.

14. A latch positioning mechanism for a door of an aircraft, comprising:
a pivot pin;
one or more locking members operatively connected to the pivot pin, wherein the one or more locking members are configured to be partially driven into a frame around the door via rotation of the pivot pin;
a frame bumper configured to extend outside of the door in a pre-catch position for contacting the frame surrounding the door;
a catch bellcrank operatively coupled to the frame bumper;
a biasing member operatively coupled to the catch bellcrank, wherein the biasing member biases rotation of the catch bellcrank to bias the frame bumper into the pre-catch position;
a catch cam operatively coupled to the pivot pin, wherein the catch bellcrank is configured to contact the catch cam when the catch bellcrank is biased into the pre-catch position such that the catch cam prevents release of the one or more locking members for locking the door;
the frame bumper is configured to contact the frame upon the door being closed thereby counterrotating the catch bellcrank to overcome the biasing member and release the catch cam enabling the one or more locking members to be moved into a locked position; and
an elastic member operatively coupled to the catch cam for biasing the catch cam such that a first side of catch cam is biased towards the catch bellcrank.

15. A pre-catch latch positioning method for a door of an aircraft, comprising:
extending a frame bumper outside of the door into a pre-catch position;
contacting a frame surrounding the door with the frame bumper upon closing of the door;
rotating a catch bellcrank operatively coupled to the frame bumper via a biasing member, wherein the biasing member biases rotation of the catch bellcrank to bias the frame bumper into the pre-catch position; and
contacting a catch cam via the catch bellcrank when the catch bellcrank is biased into the pre-catch position thereby preventing release of one or more locking members for locking the door,
wherein contacting the frame with the frame bumper upon closing of the door comprises counterrotating the catch bellcrank to overcome the biasing member and release the catch cam enabling the one or more locking members to be moved into a locked position.

16. The method of claim 15, comprising biasing the catch cam via an elastic member operatively coupled to the catch cam such that a first side of catch cam is biased towards the catch bellcrank.

17. The method of claim 16, comprising rotating the catch cam out of the pre-catch position via the elastic member upon actuation of the catch bellcrank via the frame bumper thereby automatically releasing the catch cam such that the one or more locking members are free to be moved into a locked position via an indoor handle or an exterior handle.

18. The method of claim 15, rotating a pivot pin via an indoor handle to an unlock position, following release of the catch cam, thereby retracting the one or more locking members from the frame and enabling the frame bumper to reset to the pre-catch position via the biasing member.

19. The method of claim 15, rotating a pivot pin via an indoor handle to a lock position, following release of the catch cam, thereby extending the one or more locking members into the frame for locking the door.

* * * * *